US010317582B2

(12) United States Patent
Lee et al.

(10) Patent No.: US 10,317,582 B2
(45) Date of Patent: Jun. 11, 2019

(54) OPTICAL FILM, METHOD FOR MANUFACTURING OPTICAL FILM, AND LIQUID CRYSTAL DISPLAY

(71) Applicant: LG Display Co., Ltd., Seoul (KR)

(72) Inventors: Gunwoo Lee, Gangwon-do (KR); Hyunwoo Jeon, Gyeonggi-do (KR); Sangdae Han, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 15/364,572

(22) Filed: Nov. 30, 2016

(65) Prior Publication Data
US 2017/0153363 A1   Jun. 1, 2017

(30) Foreign Application Priority Data
Nov. 30, 2015   (KR) .................. 10-2015-0168437

(51) Int. Cl.
*G02B 5/02* (2006.01)
*G02F 1/1335* (2006.01)
*G02B 5/30* (2006.01)
*G02B 5/04* (2006.01)

(52) U.S. Cl.
CPC ......... *G02B 5/0242* (2013.01); *G02B 5/0268* (2013.01); *G02B 5/04* (2013.01); *G02B 5/3025* (2013.01); *G02F 1/133504* (2013.01); *G02F 1/133528* (2013.01); *G02F 1/133606* (2013.01);
(Continued)

(58) Field of Classification Search
CPC ......... G02F 1/133528; G02F 1/133504; G02F 2202/28; G02F 2001/133507; G02F 1/133602; G02F 1/1336; G02F 1/133606; G02B 5/04; G02B 5/0242
See application file for complete search history.

(56) References Cited

U.S. PATENT DOCUMENTS 6,292,238 B1 * 9/2001 Okada ............... G02F 1/133553
                                                    349/113
2005/0046321 A1 * 3/2005 Suga ................... G02B 5/0226
                                                    313/112
(Continued)

FOREIGN PATENT DOCUMENTS

KR   10-2009-0045550 A   5/2009
KR   10-2009-0047485 A   5/2009
(Continued)

OTHER PUBLICATIONS

Korean Office Action dated Oct. 17, 2017, for corresponding Korean patent application No. 10-2015-0168437.
(Continued)

*Primary Examiner* — Michael H Caley
*Assistant Examiner* — Mariam Qureshi
(74) *Attorney, Agent, or Firm* — Morgan, Lewis & Bockius LLP

(57) ABSTRACT

Provided are an optical film, a method for manufacturing an optical film, and a liquid crystal display. An optical film includes: a polarizer, a diffusion sheet adhered to a bottom surface of the polarizer, the diffusion sheet including a plurality of first beads, and an adhesive layer between the polarizer and the diffusion sheet, the adhesive layer attaching the polarizer to the diffusion sheet, the adhesive layer including a plurality of second beads.

12 Claims, 18 Drawing Sheets

(52) U.S. Cl.
CPC ............ *G02F 2001/133507* (2013.01); *G02F 2202/28* (2013.01)

(56) References Cited

U.S. PATENT DOCUMENTS

| | | | |
|---|---|---|---|
| 2007/0221866 A1* | 9/2007 | Sohn ................... | C09K 11/7731 250/484.4 |
| 2008/0049330 A1 | 2/2008 | Tolbert et al. | |
| 2008/0231780 A1* | 9/2008 | Graf .................. | G02F 1/133606 349/112 |
| 2009/0296028 A1* | 12/2009 | Lee ........................ | G02B 5/021 349/96 |
| 2010/0165466 A1* | 7/2010 | Endo ........................ | B32B 7/14 359/599 |
| 2013/0094174 A1* | 4/2013 | Yamamoto ........... | G02B 5/0215 362/19 |
| 2015/0176797 A1* | 6/2015 | Inoue .................. | H01L 51/5268 362/311.01 |
| 2015/0277012 A1 | 10/2015 | Nakamura et al. | |
| 2017/0322348 A1* | 11/2017 | Shimamura .......... | G02B 5/0215 |

FOREIGN PATENT DOCUMENTS

| | | |
|---|---|---|
| KR | 10-2010-0088572 A | 8/2010 |
| KR | 10-2015-0113907 A | 10/2015 |

OTHER PUBLICATIONS

Korean Office Action dated May 15, 2018, for corresponding Korean patent application No. 10-2015-0168437.

\* cited by examiner

OPTICAL FILM, METHOD FOR MANUFACTURING OPTICAL FILM, AND LIQUID CRYSTAL DISPLAY

CROSS-REFERENCE TO RELATED APPLICATION(S)

This application claims the benefit of Korean Patent Application No. 10-2015-0168437, filed on Nov. 30, 2015, the entire disclosure of which is hereby incorporated by reference herein.

BACKGROUND

1. Technical Field

The present disclosure relates to a liquid crystal display having an optical film embedded therein and, more particularly, to a liquid crystal display having a structure in which an optical film for the uniformity and focusing or concentrating light provided by a backlight unit has been laminated on a lower polarizer.

2. Discussion of the Related Art

The application of a liquid crystal display has gradually increased due to its characteristics, such as light weight, a thin profile, and low power consumption. The liquid crystal display is used in portable computers, such as notebook PCs, office automation devices, audio/video devices, and indoor and outdoor advertising displays. A transmission-type liquid crystal display, used in most liquid crystal displays, can display an image by modulating light incident from a backlight unit through control of an electric field applied to a liquid crystal layer.

The backlight unit may be categorized as a direct type and an edge type. The direct-type backlight unit has a structure in which a plurality of light sources is disposed under a liquid crystal display panel. The edge-type backlight unit has a structure in which a light source is disposed to face the side of a light guide plate with a plurality of optical films disposed between a liquid crystal display panel and the light guide plate. In the edge-type backlight unit, the light source radiates light to one side of the light guide plate, and the light guide plate converts a line light source or a dot light source into a surface light source. The edge-type backlight unit has an advantage in that it can be made thinner than the direct-type backlight unit.

A liquid crystal display that includes an edge-type backlight unit according to a related art is described with reference to FIGS. 1 and 2. FIG. 1 is an exploded perspective view showing the structure of the liquid crystal display that includes an edge-type backlight unit according to the related art. FIG. 2 is a cross-sectional view showing the structure of the liquid crystal display that includes an edge-type backlight unit according to the related art, which is taken along line I-I' of FIG. 1.

With reference to FIGS. 1 and 2, the liquid crystal display according to the related art includes a liquid crystal display panel LCP and an edge-type backlight unit EBLU disposed under the liquid crystal display panel LCP. The liquid crystal display panel LCP has a liquid crystal layer LC formed between an upper glass substrate SU and a lower glass substrate SL, and may be implemented in any liquid crystal mode. The liquid crystal display panel LCP also has an upper polarizer UPOL on the upper glass substrate SU and a lower polarizer LPOL under the lower glass substrate SL.

The edge-type backlight unit EBLU includes a light source LS, a light guide plate LG, and an optical film OPT. The edge-type backlight unit EBLU converts light, output by the light source LS, into a uniform surface light source through the light guide plate LG and the optical film OPT, and provides the converted uniform surface light source to the liquid crystal display panel LCP. Furthermore, a reflection plate REF for returning light that leaks through the bottom of the light guide plate LG to the light guide plate LG may be further provided under the light guide plate LG.

A cover bottom CB is disposed under the reflection plate REF. The cover bottom CB may have a bowl or container shape in which the edge-type backlight unit EBLU is received. Furthermore, the cover bottom CB includes a material having high thermal conductivity and high stiffness so that heat from the light source LS can be smoothly discharged to the outside. For example, the cover bottom CB may be formed using a metal plate, such as aluminum (Al), aluminum nitride (AlN), an electronic galvanized steel sheet (EGI), stainless steel (SUS), Galvalume (SGLC), an aluminized steel sheet (so-called "ALCOSTA"), or a tin plate steel sheet (SPTE). Furthermore, the metal plate may be coated with a high conductivity material for accelerating thermal transfer.

A guide panel GP and the top case TC are disposed at the edge of the liquid crystal display panel LCP. The guide panel GP has a rectangular mold frame in which glass fiber is mixed in synthetic resin, such as polycarbonate. The guide panel GP surrounds the top edge and sides of the liquid crystal display panel LCP and surrounds the sides of the edge-type backlight unit EBLU. The guide panel GP supports the liquid crystal display panel LCP and maintains a uniform spacing between the liquid crystal display panel LCP and the optical film OPT. The top case TC is made of a metal material, such as a zinc plate steel sheet, and has a structure that surrounds the top and sides of the guide panel GP. The top case TC is fixed to at least one of the guide panel GP and the cover bottom CB by a hook or a screw.

A light-emitting device having high brightness with low power consumption, like a light-emitting diode (LED), may be used as the light source LS. The light source LS supplies light to the light guide plate LG. In the edge-type backlight unit EBLU, the light source LS is located at the side of the liquid crystal display panel LCP. That is, the light source LS supplies light to a side of the light guide plate LG in accordance with at least one side of the light guide plate LG.

The light guide plate LG has a panel type rectangular parallelepiped shape having a face corresponding to the area of the liquid crystal display panel LCP. The top surface of the light guide plate LG faces the liquid crystal display panel LCP. The light guide plate LG functions to receive light from the light source LS installed on the side of the light guide plate LG, to diffuse and distribute the light therein so that the light is uniformly distributed within the light guide plate LG, and to guide the light to the top surface on which the liquid crystal display panel LCP has been disposed.

The light guided to the liquid crystal display panel LCP by the light guide plate LG is not suitable for being used as a backlight. For example, the light may not have a uniform brightness distribution over the entire area of the liquid crystal display panel LCP. Alternatively, the light may not have been concentrated in the direction of a viewer with respect to a surface of the liquid crystal display panel LCP. Accordingly, for the light to be used as a backlight, it is necessary to concentrate and diffuse the light in particular locations.

For such a function, the optical film OPT is disposed between the light guide plate LG and the liquid crystal display panel LCP. The structure of the optical films OPT according to a related art is described below with reference to FIGS. 3-4. FIG. 3 is a cross-sectional view showing the structure of optical films, including a diffusion film, in a liquid crystal display according to a related art.

The optical films OPT disposed under the liquid crystal display panel LCP of FIG. 3 have a stack structure that is widely used. For example, the optical films OPT may have a structure in which a lower prism sheet PRL, an upper prism sheet PRU, and a diffusion sheet DIF have been sequentially stacked.

Trigonal prism patterns are disposed in parallel on the top surface of the lower prism sheet PRL. More specifically, a convex peak portion and a concave valley portion are alternately disposed on the lower prism sheet PRL. Pointed peak portions are arranged in parallel in a first direction. The upper prism sheet PRU may also have the same prism pattern as the lower prism sheet PRL. In this case, the tops of the upper prism sheet PRU are disposed in parallel in a second direction orthogonal to the first direction. Light emitted from the light guide plate LG is concentrated in the form of a Gaussian distribution with respect to a normal line for the surface of the liquid crystal display panel LCP, while passing through the lower prism sheet PRL and the upper prism sheet PRU.

The diffusion sheet DIF functions to distribute pieces of light passing through the prism sheets PRL and RPU so that the pieces of light have a uniform brightness distribution over the entire surface of the liquid crystal display panel LCP. For example, in the case of the edge-type backlight unit, a side face in which the light source is positioned may be brighter than a side face opposite the side face in which the light source is positioned. Furthermore, in the case of the direct-type backlight unit, a portion in which the light source is positioned may be brighter than the surrounding portion of the light source. The diffusion sheet DIF functions to uniformly diffuse a brightness distribution of light that is not uniform with respect to the entire surface of the liquid crystal display panel LCP. For such a diffusion function, beads BD may have been distributed on the top surface of the diffusion sheet DIF.

Light becomes suitable for being used as backlight by the prism sheets PRL and RPU and the diffusion sheet DIF, but there may be a problem in that brightness is deteriorated while the light passes through the optical films. This becomes a reason for deteriorating energy efficiency required to generate the backlight. More specifically, brightness is significantly reduced by the diffusion sheet DIF. To solve such a problem, there has been proposed a high brightness diffusion film DBEF. FIG. 4 is a cross-sectional view showing the structure of optical films including a high brightness diffusion film DBEF in a liquid crystal display according to a related art.

The high brightness diffusion film DBEF has a high refraction layer and a low refraction layer stacked thereon, and thus solves a problem in that brightness is reduced by reflecting light lost by reflection to its top surface again. FIG. 4 has the same structure as FIG. 3, except that the high brightness diffusion film DBEF has been disposed instead of the diffusion film DIF.

As described above, the optical films according to a related art have a structure in which they have been sequentially stacked between the liquid crystal display panel LCP and the light guide plate LG. That is, the upper prism sheet PRU is disposed on the lower prism sheet PRL in the lay-down state. Accordingly, a specific air layer is present between the upper prism sheet PRU and the lower prism sheet PRL. The air layer has a refractive index different from that of the prism sheets PRL and RPU, and thus an effect can be obtained in that light passing through the prism sheets PRL and RPU is diffused.

Likewise, the diffusion film DIF or the high brightness diffusion film DBEF is also disposed on the upper prism sheet PRU in the lay-down state. Accordingly, an air layer is present between the upper prism sheet PRU and the diffusion film DIF or between the upper prism sheet PRU and the high brightness diffusion film DBEF. Thus, an effect can be obtained in that light is diffused while passing through the air layers.

However, thickness of the device is increased due to the structure in which the optical films OPT are simply stacked, which becomes an obstacle to the desired thinness of a liquid crystal display. An attempt has been made to make the optical films OPT ultra-thin by laminating them. However, if the optical films OPT are simply laminated, a diffusion effect by using an air layer cannot be obtained because the air layer disappears, resulting in an irregular brightness distribution. Furthermore, a moiré pattern, a rainbow mura pattern, or a pattern of a hot-spot form is generated. Defects, such as irregular brightness, pattern generation, light bleeding failure, etc. are seen as being deficient enough that light cannot be suitably used as backlight, preventing a liquid crystal display from becoming ultra-thin.

SUMMARY

Accordingly, the present disclosure is directed to an optical film, a method for manufacturing an optical film, and a liquid crystal display that substantially obviate one or more of the problems due to limitations and disadvantages of the related art.

An object of the present disclosure is to provide an ultra-thin liquid crystal display with which an optical film has been integrated. Another object of the present disclosure is to provide a liquid crystal display capable of improving light uniformity and brightness by forming an air layer between an integrated lower polarizer and diffusion sheet.

Another embodiment of the present disclosure is directed to the provision of an ultra-thin liquid crystal display with which an optical film has been integrated by laminating a lower polarizer, a diffusion sheet, and a prism sheet.

Additional features and advantages will be set forth in the description which follows, and in part will be apparent from the description, or may be learned by practice of the invention. The objectives and other advantages of the disclosure will be realized and attained by the structure particularly pointed out in the written description and claims thereof as well as the appended drawings.

To achieve these and other advantages and in accordance with the purpose of the present disclosure, as embodied and broadly described, there is provided an optical film, including: a polarizer, a diffusion sheet adhered to a bottom surface of the polarizer, the diffusion sheet including a plurality of first beads, and an adhesive layer between the polarizer and the diffusion sheet, the adhesive layer attaching the polarizer to the diffusion sheet, the adhesive layer including a plurality of second beads.

In another aspect, there is provided a method for manufacturing an optical film, the method including: forming a diffusion sheet by coating a resin including a plurality of first beads on a support film, providing adhesives including a plurality of second beads in a spray device, forming an adhesive layer by spraying the adhesives on a polarizer, and laminating the diffusion sheet and the polarizer using the adhesive layer therebetween.

In another aspect, there is provided a liquid crystal display, including: a display panel, and an optical film adhered under the display panel, the optical film including: a polarizer, a diffusion sheet adhered to a bottom surface of the polarizer, the diffusion sheet including a plurality of first beads, and an adhesive layer between the polarizer and the diffusion sheet, the adhesive layer attaching the polarizer to the diffusion sheet, the adhesive layer including a plurality of second beads.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with the embodiments of the disclosure. It is to be understood that both the foregoing general description and the following detailed description of the present disclosure are examples and explanatory, and are intended to provide further explanation of the disclosure as claimed.

BRIEF DESCRIPTION OF THE DRAWINGS

The accompanying drawings, which are included to provide a further understanding of the invention and are incorporated in and constitute a part of this specification, illustrate implementations of the invention and together with the description serve to explain the principles of the disclosure.

Figure 1:
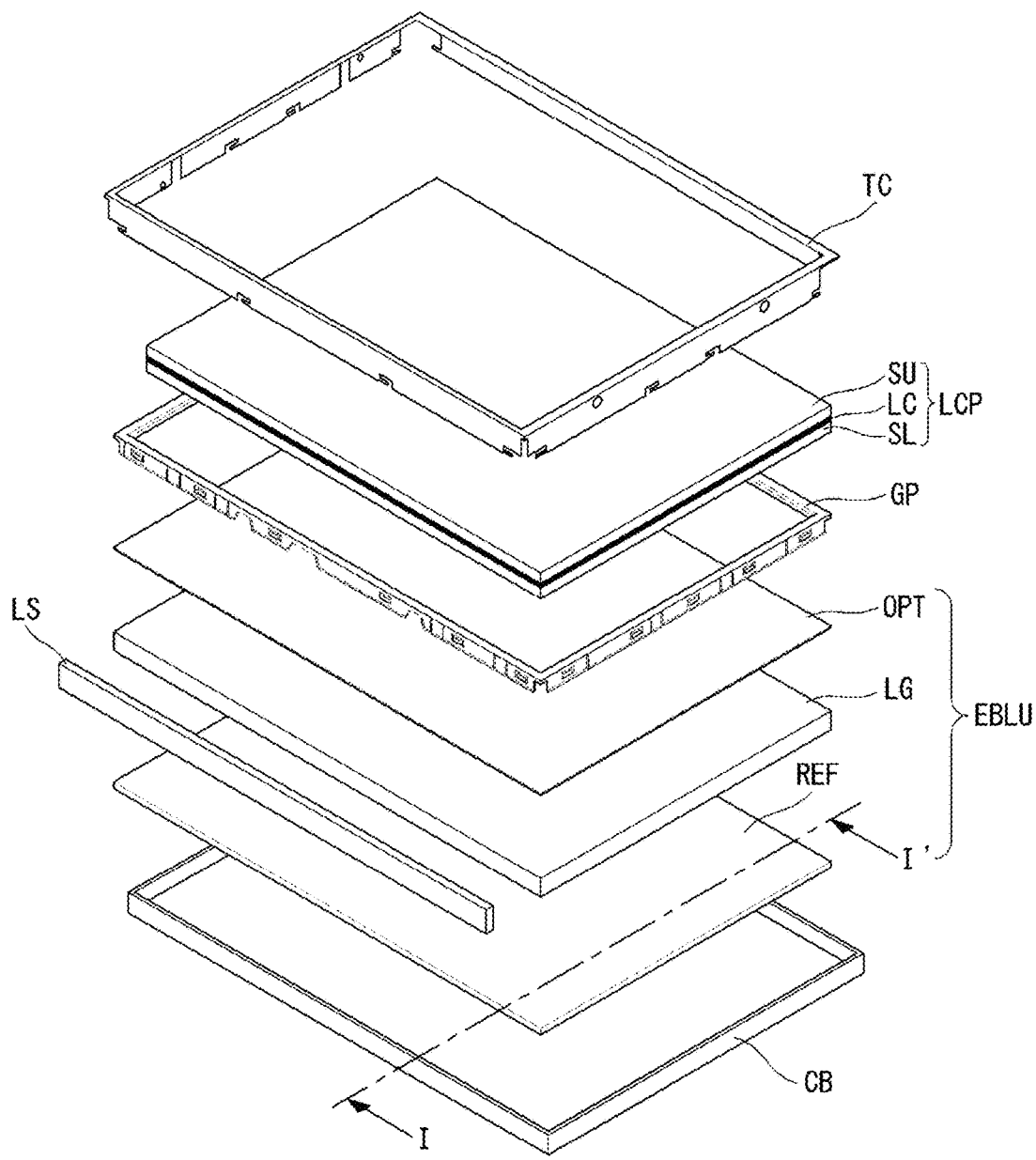
FIG. 1 is an exploded perspective view showing the structure of a liquid crystal display that includes an edge-type backlight unit according to a related art.
Figure 2:
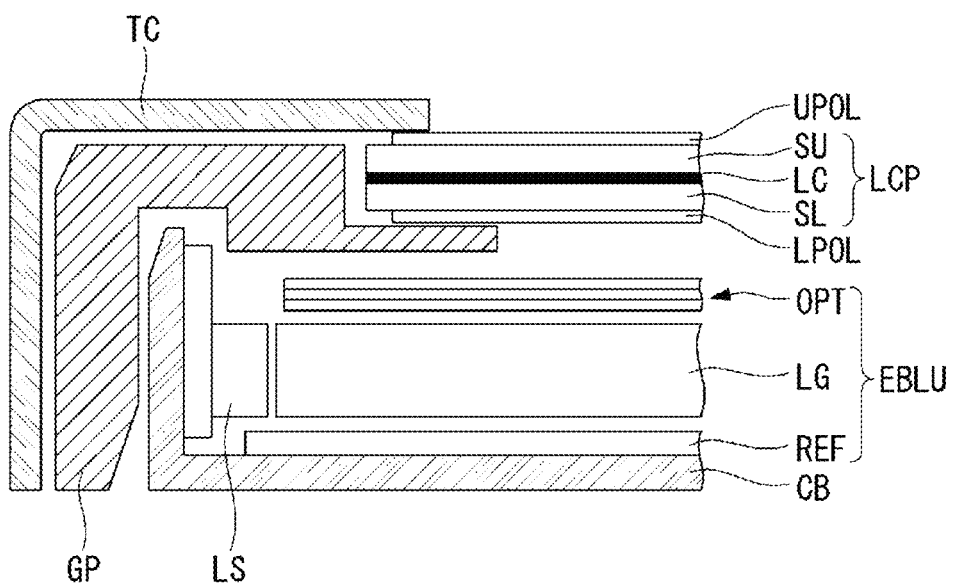
FIG. 2 is a cross-sectional view showing the structure of the liquid crystal display that includes an edge-type backlight unit according to the related art, taken along line I-I' of FIG. 1.
Figure 3:
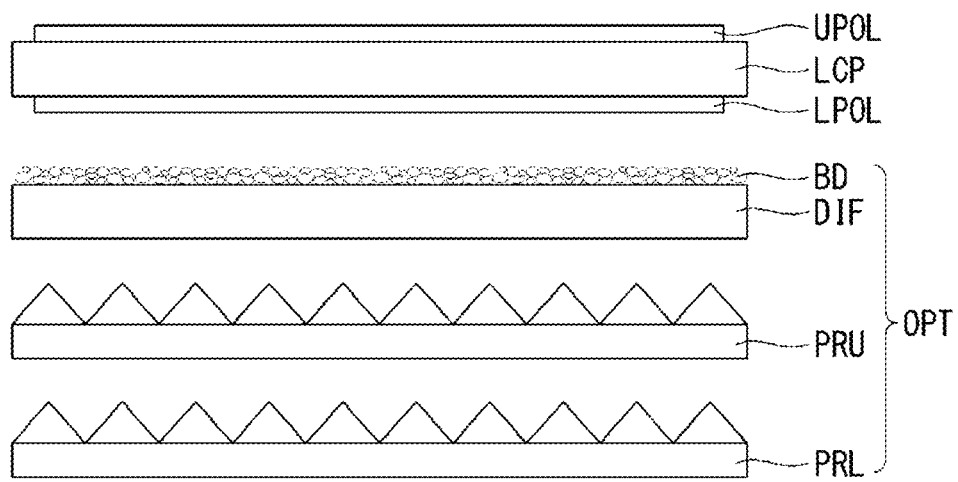
FIG. 3 is a cross-sectional view showing the structure of optical films including a diffusion film in a liquid crystal display according to a related art.
Figure 4:
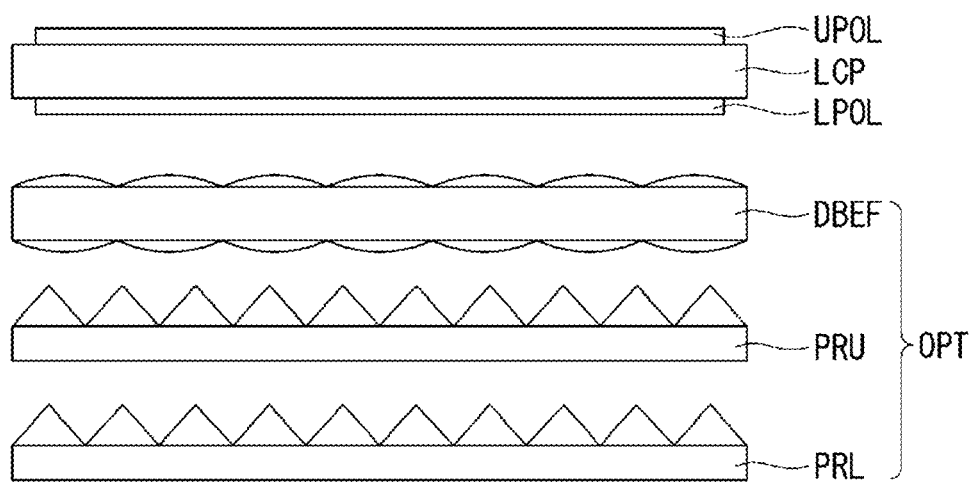
FIG. 4 is a cross-sectional view showing the structure of optical films, including a high brightness diffusion film, in a liquid crystal display according to a related art.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

Reference will now be made in detail to embodiments of the present disclosure, examples of which are illustrated in the accompanying drawings. In the following description, when a detailed description of well-known functions or configurations related to this document is determined to unnecessarily cloud a gist of the invention, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a certain order. Like reference numerals designate like elements throughout. Names of the respective elements used in the following explanations are selected only for convenience of writing the specification and may be thus different from those used in actual products.

In the description of embodiments, when a structure is described as being positioned "on or above" or "under or below" another structure, this description should be construed as including a case in which the structures contact each other as well as a case in which a third structure is disposed therebetween.

Figure 5:
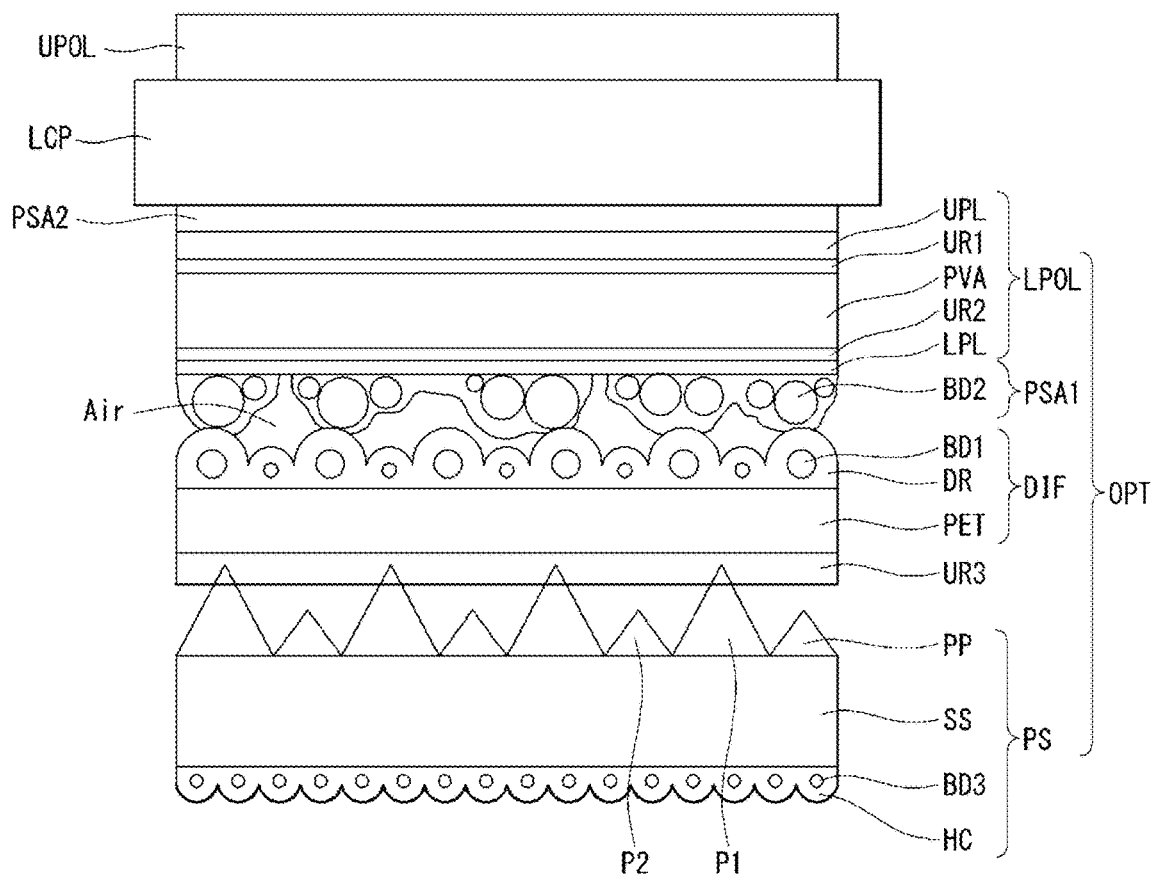
FIG. 5 is a cross-sectional view showing the structure of a liquid crystal display according to an embodiment of the present disclosure.
Figure 6:
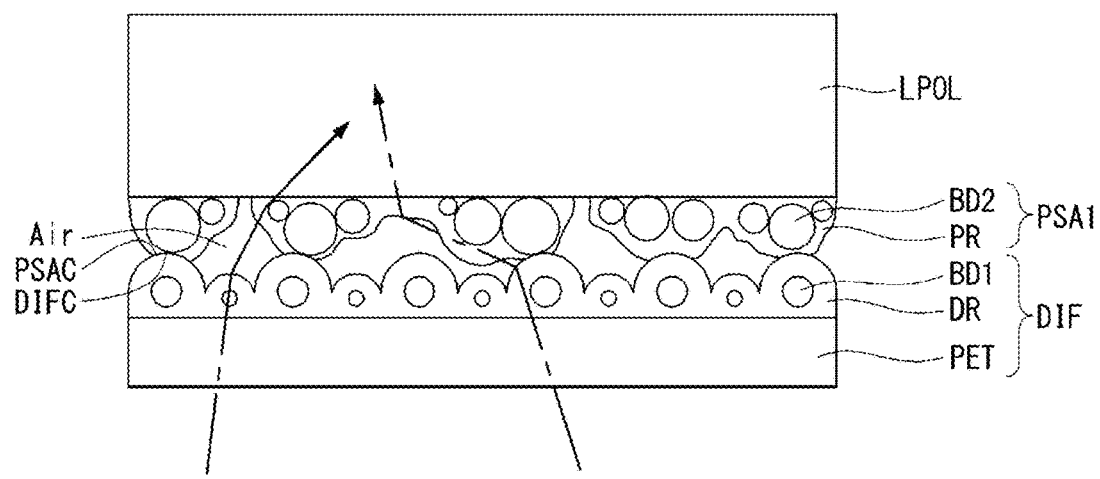
FIG. 6 is a cross-sectional view showing a portion of the liquid crystal display according to an embodiment of the present disclosure.
Figure 7:
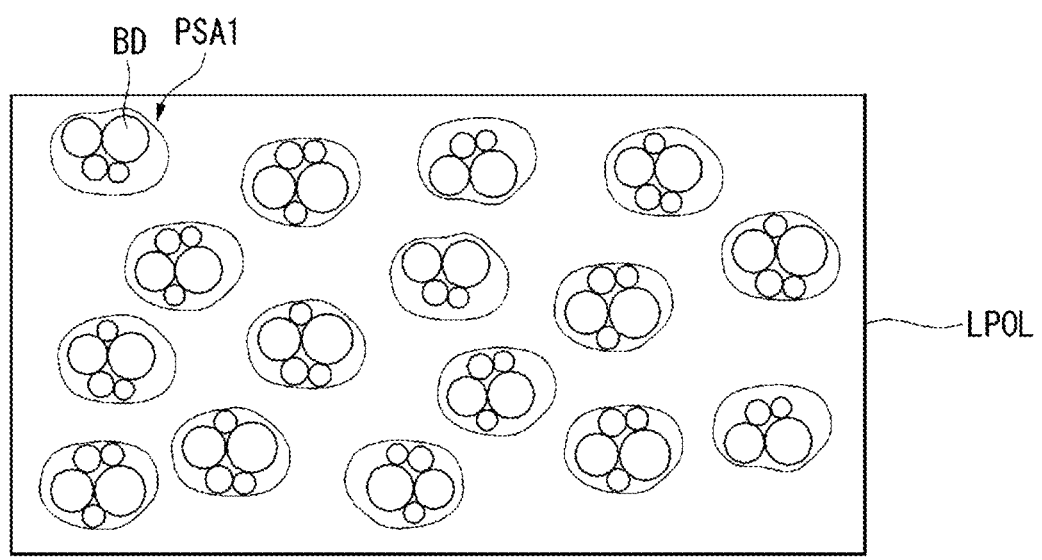
FIGS. 7 to 9 are plan views showing an adhesive layer according to an embodiment of the present disclosure.
Figure 8:
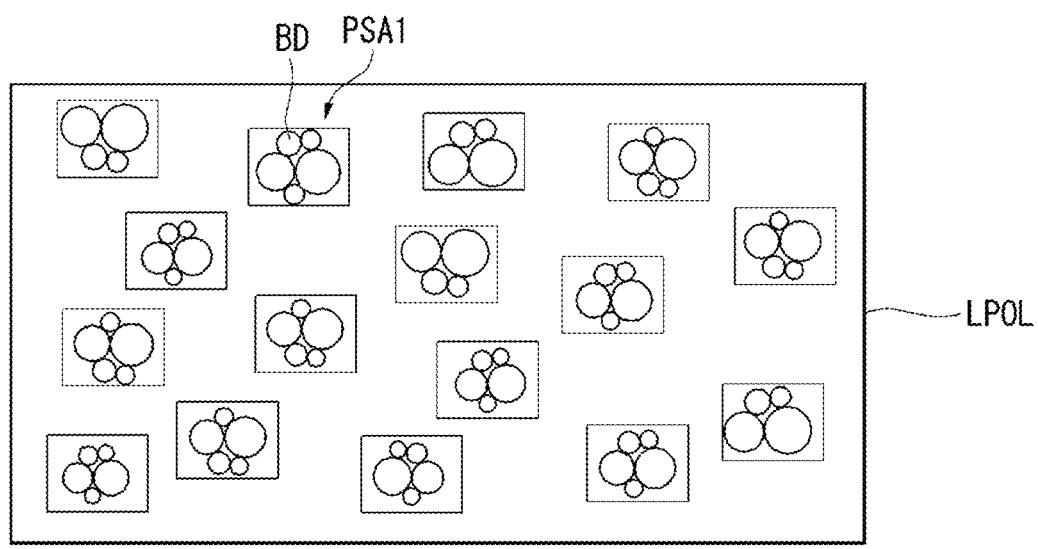
Figure 9:
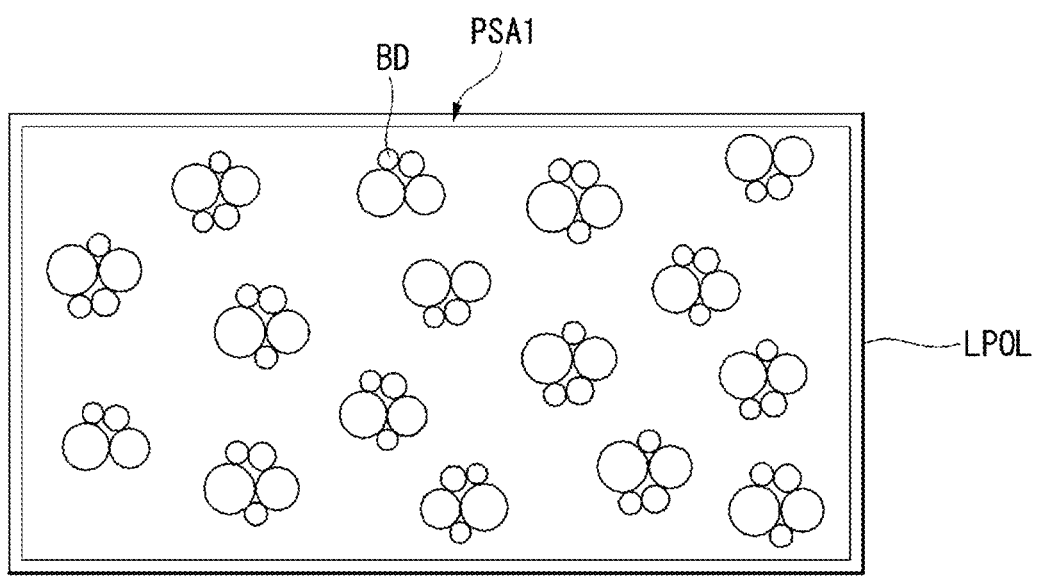

FIG. 5 is a cross-sectional view showing the structure of a liquid crystal display according to an embodiment of the present disclosure. FIG. 6 is a cross-sectional view showing a portion of the liquid crystal display according to an embodiment of the present disclosure. FIGS. 7 to 9 are plan views showing an adhesive layer according to an embodiment of the present disclosure.

With reference to FIG. 5, the liquid crystal display (LCD) according to an embodiment of the present disclosure may include an LCD panel LCP, an upper polarizer UPOL, and an optical film OPT.

The LCD panel LCP may include an upper substrate and a lower substrate opposing each other with a liquid crystal layer interposed therebetween. The upper polarizer UPOL may be on a top surface of the LCD panel LCP. The lower polarizer LPOL may be on a bottom surface of the LCD panel LCP. The upper polarizer UPOL may have light transmission axes or light blocking axes aligned in a first direction. The lower polarizer LPOL may have light transmission axes or light blocking axes aligned in a second direction. If an LCD is normally black, the first light transmission axis and the second light transmission axis may be orthogonal to each other. In contrast, if an LCD is normally white, the first light transmission axis and the second light transmission axis may be disposed in parallel.

The optical film OPT may include the lower polarizer LPOL, a first adhesive layer PSA1, a diffusion sheet DIF, and a prism sheet PS. The lower polarizer LPOL may include a core layer PVA, an upper protection layer UPL protecting the top surface of the core layer PVA, and a lower protection layer LPL protecting the bottom surface of the core layer PVA. The core layer PVA may polarize light and may be made of, e.g., polyvinyl alcohol (PVA). Depositing PVA formed by a depositing method or coating PVA formed by a coating method may be used as the core layer PVA, although embodiments are not limited thereto. The core layer PVA may be deformed by moisture included in the air. Accordingly, a protection layer may be positioned on at least one surface of the core layer PVA. In an embodiment of the present disclosure, the upper protection layer UPL may be over the core layer PVA, and the lower protection layer LPL may be under the core layer PVA. The upper protection layer UPL and the lower protection layer LPL may be made of, e.g., triacetatecellulose (TAC), acryl, polyethylene terephthalate (PET), polycarbonate (PC), or polyethylene naphthenate (PEN), although embodiments are not limited thereto. The upper protection layer UPL may adhere to the core layer PVA by a first ultraviolet (UV) adhesive layer UR1, and the lower protection layer LPL may adhere to the core layer PVA through a second UV adhesive layer UR2. Any appropriate transparent adhesives may be used as the first UV adhesive layer UR1 and the second UV adhesive layer UR2.

In an embodiment of the present disclosure, the lower polarizer LPOL may have a structure including the core layer PVA, the upper protection layer UPL on the top surface of the core layer PVA, and the lower protection layer LPL on the bottom surface of the core layer PVA. Alternatively, embodiments may omit at least one of the upper protection layer UPL and the lower protection layer LPL.

The diffusion sheet DIF may distribute light passing through the prism sheet PS so that the light has a uniform brightness distribution over the entire surface of the LCD panel LCP. For example, in the case of the edge-type backlight unit, a side face on which a light source is positioned may be brighter than a side face that is opposite the side face on which a light source is positioned. Furthermore, in the case of the direct-type backlight unit, a portion in which a light source is positioned may be brighter than the surrounding portion of the light source. The diffusion sheet DIF may uniformly diffuse a brightness distribution of light that is not uniform over the entire surface of the LCD panel LCP.

The diffusion sheet DIF may include a support film PET and a diffusion unit DR on the support film PET, and may include a plurality of first beads BD1. The support film PET may transmit light incident from a light source, and may support the diffusion unit DR. To this end, the support film PET may be made of a material that is capable of transmitting light incident from a light source and that has a resistance force against moisture in the air, for example, polyethylene terephthalate (PET), polycarbonate (PC), polypropylene (PP), polyethylene (PE), polystyrene (PS), and/or polyepoxy (PE), but is not limited thereto. The support film PET may be thin in accordance with the thinness of a backlight unit, for example, a thickness of 10 μm to 250 μm. If the support film PET has a thickness of 10 μm or more, the backlight unit can be made as thin as possible within the limits in which the mechanical physical and heat-resistant properties of the optical film are not deteriorated. Furthermore, if the support film PET has a thickness of 250 μm or less, the thinness of the backlight unit can be achieved and the mechanical physical and heat-resistant properties of the optical film can also be maximized.

The diffusion unit DR into which the plurality of first beads BD1 has been dispersed may be positioned on the support film PET. The diffusion unit DR may support the plurality of first beads BD1 while dispersing them. The diffusion unit DR may be made of the same kind of resin as the support film PET, or may be made of resin different from that of the support film PET.

The plurality of first beads BD1 may be made of the same kind of resin as the support film PET, or may be made of resin different from that of the support film PET. The diffusion unit DR may include 10-50 weight % of the plurality of first beads BD1. The size of the first beads BD1 may be properly selected depending on a thickness of the diffusion unit DR, and may be, e.g., 1 μm to 10 μm. The first beads BD1 may have substantially the same size, and may have a uniform distribution within the diffusion unit DR. In some embodiments, the first beads BD1 may have different sizes, and may have an irregular distribution within the diffusion unit DR. The diffusion sheet DIF may improve the uniformity of light by diffusing the light. A total haze of the diffusion sheet DIF may be 20% to 100% to cover an underlying light source.

The prism sheet PS may include a prism portion PP having prism patterns formed on a base sheet SS. The base sheet SS may transmit light incident from the light source, and may protect the prism portion PP of the prism sheet PS. To this end, the base sheet SS may be made of a material that is capable of transmitting light incident from the light source and that has a resistance force against moisture in the air, for example, polyethylene terephthalate (PET), polycarbonate (PC), polypropylene (PP), polyethylene (PE), polystyrene (PS), and/or polyepoxy (PE), but is not limited thereto. The base sheet SS may be formed to have a thickness in accordance with the thinness of the backlight unit, for example, a thin thickness of 10 μm to 250 μm. If the base sheet SS has a thickness of 10 μm or more, the backlight unit can be made as thin as possible within the limits in which the mechanical physical and heat-resistant properties of the optical film are not deteriorated. Furthermore, if the base sheet SS has a thickness of 250 μm or less, the thinness of the backlight unit can be achieved and the mechanical physical and heat-resistant properties of the optical film can also be maximized.

The prism portion PP may be disposed on the base sheet SS, and may focus (or concentrate) light incident from the light source by the plurality of prism patterns. The prism portion PP may include a first prism pattern P1, having a first height, and a second prism pattern P2, having a second height. The first height and the second height may be different.

The LCD according to an embodiment of the present disclosure may have a structure in which the prism sheet PS has been laminated on the diffusion sheet DIF by a third UV adhesive layer UR3. For example, a portion of the plurality of prism patterns P1 and P2 of the prism portion PP formed in the prism sheet PS may be inserted into the third UV adhesive layer UR3. The first prism patterns P1 having the first height and the second prism patterns P2 having the second height may be alternately disposed in the prism sheet PS. Accordingly, a portion of a peak having a higher one of the first height and the second height may be inserted into the third UV adhesive layer UR3. For example, if the first height is greater than the second height, part of the first prism patterns P1 having the first height may be inserted into the third UV adhesive layer UR3.

As described above, although a portion of the at least one first prism pattern P1 may be inserted into the third UV adhesive layer UR3, the second prism patterns P2 may be spaced apart from the third UV adhesive layer UR3 at a specific interval. That is, an air layer may be interposed between the third UV adhesive layer UR3 and the second prism patterns P2. If the prism portion PP of the prism sheet PS does not include peaks having different heights, the size of the air layer may be significantly reduced and a light-focusing characteristic may be deteriorated because all the peaks of the prism portion PP would be inserted into the third UV adhesive layer UR3. As a result, brightness may be deteriorated because light may not be sufficiently refracted. Accordingly, in an embodiment of the present disclosure, the first prism patterns P1 and the second prism patterns P2 may have different heights. In an embodiment of the present disclosure, a sufficient air layer can be secured between the third UV adhesive layer UR3 and the second prism patterns P2 because the prism patterns P1 and P2 of the prism portion PP of the prism sheet PS may have different heights, thereby being capable of minimizing a brightness loss.

The prism sheet PS may further include a hard coating layer HC having a plurality of third beads BD3 on the bottom surface of the base sheet SS. The hard coating layer HC may protect the prism sheet PS against an external impact or physical force. The plurality of third beads BD3 may be dispersed in resin in a small quantity. Although the hard coating layer HC has been illustrated as being included in the FIG. 5 example, the hard coating layer HC is optional and may be omitted.

The adhered diffusion sheet DIF and prism sheet PS may adhere to the lower polarizer LPOL. For example, the first adhesive layer PSA1 may be disposed between the lower polarizer LPOL and the diffusion sheet DIF. The first adhesive layer PSA1 may attach the lower polarizer LPOL to the diffusion sheet DIF. Any appropriate adhesive having high elasticity and a good adhesive characteristic and is capable of preventing being peeled off by reducing the generation of a fine bubble may be used as the first adhesive layer PSA1. For example, pressure sensitive adhesives (PSA), UV adhesives, or water-based adhesives may be used as the first adhesive layer PSA1. Furthermore, the first adhesive layer PSA1 may function as an adhesive, and may also may protect the sheets against an external impact because it has specific elasticity.

In an embodiment of the present disclosure, although the diffusion sheet DIF and the lower polarizer LPOL may adhere to each other by the first adhesive layer PSA1, light can be diffused from the diffusion sheet DIF. To this end, in an embodiment of the present disclosure, the first adhesive layer PSA1 formed between the diffusion sheet DIF and the lower polarizer LPOL may include a plurality of second beads BD2. A condition in which the diffusion of light is generated may include that the light has to be refracted due to a difference between the refractive indices of two media.

In general, materials used in the optical film OPT may have a refractive index in the range of, e.g., 1.5 to 1.7. If the diffusion sheet DIF and the lower polarizer LPOL adhere to each other by the first adhesive layer PSA1, the diffusion of light may not be generated because there may be no difference between the refractive indices of the diffusion sheet DIF and the first adhesive layer PSA1. For this reason, in an embodiment of the present disclosure, an air layer Air may be between the diffusion sheet DIF and the first adhesive layer PSA1 by including the plurality of second beads BD2 in the first adhesive layer PSA1. The air layer Air may be disposed in the remaining space other than the first adhesive layer PSA1 between the diffusion sheet DIF and the lower polarizer LPOL.

For example, with reference to FIG. 6, the optical film OPT according to an embodiment of the present disclosure may include the first adhesive layer PSA1 between the lower polarizer LPOL and the diffusion sheet DIF. The refractive indices of the first beads BD1 and diffusion unit DR of the diffusion sheet DIF may have a range of, e.g., 1.5 to 1.7. The refractive indices of the first adhesive layer PSA1 and the second beads BD2 dispersed in the first adhesive layer PSA1 may have a range of, e.g., 1.5 to 1.7. The air layer Air between the diffusion sheet DIF and the first adhesive layer PSA1 may have a refractive index of 1.0.

Accordingly, light that is incident from the bottom of the diffusion sheet DIF to the lower polarizer LPOL may pass through the air layer Air. Because the diffusion sheet DIF and the air layer Air may have different refractive indices, the light may be refracted at the interface of the diffusion sheet DIF and the air layer Air. Thus the path of the light may be changed. When the path of the light is changed, the light may be focused upward or may be diffused laterally. The light passing through the air layer Air may be refracted again at the interface of the first adhesive layer PSA1 having a different refractive index, and may be focused or diffused. Accordingly, the optical film OPT according to an embodiment of the present disclosure may include the first adhesive layer PSA1 having the plurality of second beads BD2 between the diffusion sheet DIF and the lower polarizer LPOL. As a result, there are advantages in that the diffusion sheet DIF and the lower polarizer LPOL can adhere to each other and in that the air layer Air may also be formed between the diffusion sheet DIF and the first adhesive layer PSA1, thereby being capable of diffusing light.

Furthermore, in an embodiment of the present disclosure, the diffusion sheet DIF and the first adhesive layer PSA1 may be spaced apart from each other at a specific area so that the air layer Air may be formed between the diffusion sheet DIF and the first adhesive layer PSA1. To this end, the first adhesive layer PSA1 according to an embodiment of the present disclosure may include the plurality of second beads BD2. The plurality of second beads BD2 dispersed in the first adhesive layer PSA1 may form an uneven surface of the first adhesive layer PSA1. The diffusion sheet DIF adhered to the first adhesive layer PSA1 may also have an uneven surface due to the first beads BD1. When the first adhesive layer PSA1 and the diffusion sheet DIF adhere to each other, the convex parts PSAC of the first adhesive layer PSA1 and the convex parts DIFC of the diffusion sheet DIF may come into contact with each other in some places. The convex part PSAC of the first adhesive layer PSA1 may form a step along with another contiguous area, and the convex part DIFC of the diffusion sheet DIF may also form a step along with another contiguous area. Accordingly, the air layer Air may be formed between locations where the convex part PSAC of the first adhesive layer PSA1 and the convex part DIFC of the diffusion sheet DIF are in contact with each other. That is, the air layer Air may be formed in the area where the first adhesive layer PSA1 and the diffusion sheet DIF are not in contact with each other.

As described above, in an embodiment of the present disclosure, the convex part PSAC of the first adhesive layer PSA1 and the convex part DIFC of the diffusion sheet DIF may be in contact with other at a specific area, and the first adhesive layer PSA1 and the diffusion sheet DIF may not contact each other in the remaining areas. Accordingly, the air layer Air may be formed between the first adhesive layer PSA1 and the diffusion sheet DIF. To this end, the first adhesive layer PSA1 according to an embodiment of the present disclosure may be irregularly positioned on the surface of the lower polarizer LPOL.

With reference to FIG. 7, the first adhesive layer PSA1 including the plurality of second beads BD2 may be irregularly positioned on the lower polarizer LPOL. The first adhesive layer PSA1 may isolate the lower polarizer LPOL and the diffusion sheet DIF while attaching them. If the first adhesive layer PSA1 including the plurality of second beads BD2 is uniformly coated on the lower polarizer LPOL as a single layer, the adhesion between the lower polarizer LPOL and the diffusion sheet DIF may be strengthened, but the isolation between the lower polarizer LPOL and the diffusion sheet DIF may be weak. For this reason, the first adhesive layer PSA1 according to an embodiment of the present disclosure may be irregularly positioned on the lower polarizer LPOL so that the diffusion sheet DIF may adhere to the lower polarizer LPOL in the area in which the second beads BD2 of the first adhesive layer PSA1 are positioned, and the diffusion sheet DIF may be isolated from the lower polarizer LPOL in the area in which the second beads BD2 of the first adhesive layer PSA1 are not positioned. As a result, the air layer Air may be formed because the diffusion sheet DIF and the first adhesive layer PSA1 may be spaced apart from each other in the area in which the second beads BD2 of the first adhesive layer PSA1 are not positioned.

With reference to FIGS. 7 and 8, the first adhesive layer PSA1 according to an embodiment of the present disclosure may be disposed in a dot shape. In this case, the first adhesive layer PSA1 may be positioned in a form in which water drops are dispersed, including the plurality of second beads BD2, or may be positioned in a rectangular dot shape including the plurality of second beads BD2. Areas in which the first adhesive layer PSA1 is not formed may surround the areas having the first adhesive layer PSA1 on the lower polarizer LPOL. Embodiments are not limited to these shapes.

In contrast, with reference to FIG. 9, the first adhesive layer PSA1 according to an embodiment of the present disclosure may be formed on the entire bottom surface of the lower polarizer LPOL in a layer form, but the plurality of second beads BD2 may be irregularly disposed. In this case, the plurality of second beads BD2 may be grouped to form a plurality of groups. Although not shown, the first adhesive layer PSA1 according to an embodiment of the present disclosure may have any arbitrary shape if the groups of a plurality of second beads BD2 are spaced apart from each other, and may also have a line-by-line form. Embodiments are not limited to these examples.

The plurality of second beads BD2 included in the first adhesive layer PSA1 according to an embodiment of the present disclosure may be included in the first adhesive layer PSA1 in a specific area density range so that the second beads BD2 function to attach the lower polarizer LPOL to the diffusion sheet DIF, and also to isolate them. The plurality of second beads BD2 may have an area density of 50 to 200 per $mm^2$ within the first adhesive layer PSA1. In this case, if the area density of the plurality of second beads BD2 is 50 or more per $mm^2$, the adhesive force between the first adhesive layer PSA1 and the diffusion sheet DIF can be increased and the diffusion characteristic of light can be improved. If the area density of the plurality of second beads BD2 is 200 or less per $mm^2$, brightness of light can be prevented from being deteriorated.

The optical film OPT in which the lower polarizer LPOL, the first adhesive layer PSA1, the diffusion sheet DIF, and the prism sheet PS have been laminated into one film as described above may adhere to the bottom surface of the LCD panel LCP through a second adhesive layer PSA2.

As described above, the optical film according to an embodiment of the present disclosure has an advantage in that it can diffuse light incident from the lower side by refracting the light at the interface of the diffusion sheet and the air layer and at the interface of the air layer and the first adhesive layer because the first adhesive layer including the plurality of second beads is formed between the lower polarizer and the diffusion sheet. Furthermore, the LCD according to an embodiment of the present disclosure has an advantage in that it can prevent a moiré phenomenon from occurring by securing the haze of the diffusion sheet through the optical film.

Furthermore, in an embodiment of the present disclosure, the lower polarizer, the first adhesive layer, the diffusion sheet, and the prism sheet are integrated and disposed under the LCD panel. Accordingly, there is an advantage in that the LCD can be made thin as possible because separate optical films are omitted and the thickness of the backlight unit is reduced.

A method for manufacturing the optical film according to an embodiment of the present disclosure is described below.

Figure 10:
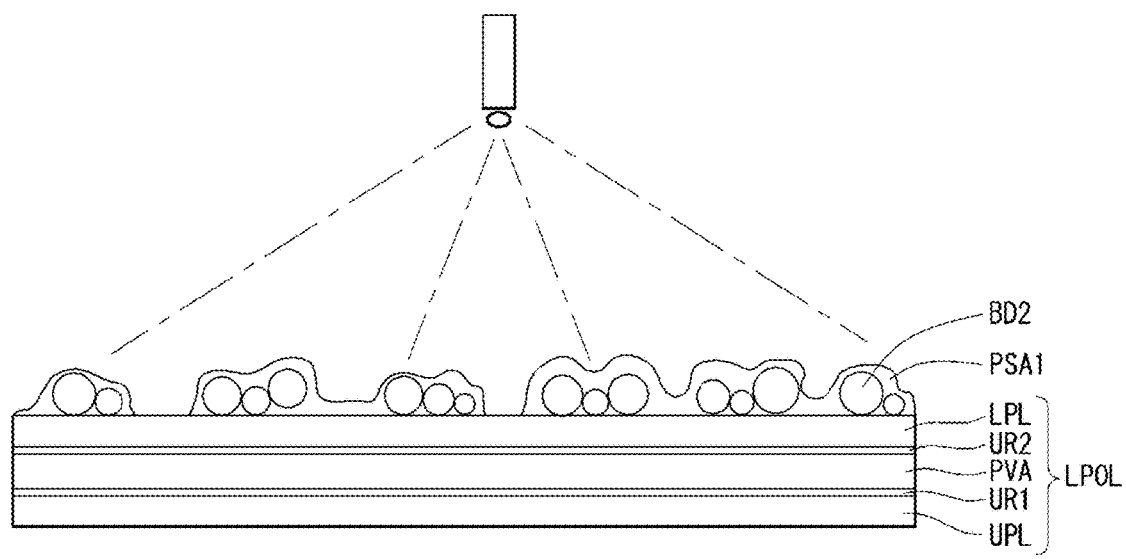
FIGS. 10 to 12 are cross-sectional views showing a process for manufacturing an optical film according to an embodiment of the present disclosure.
Figure 11:
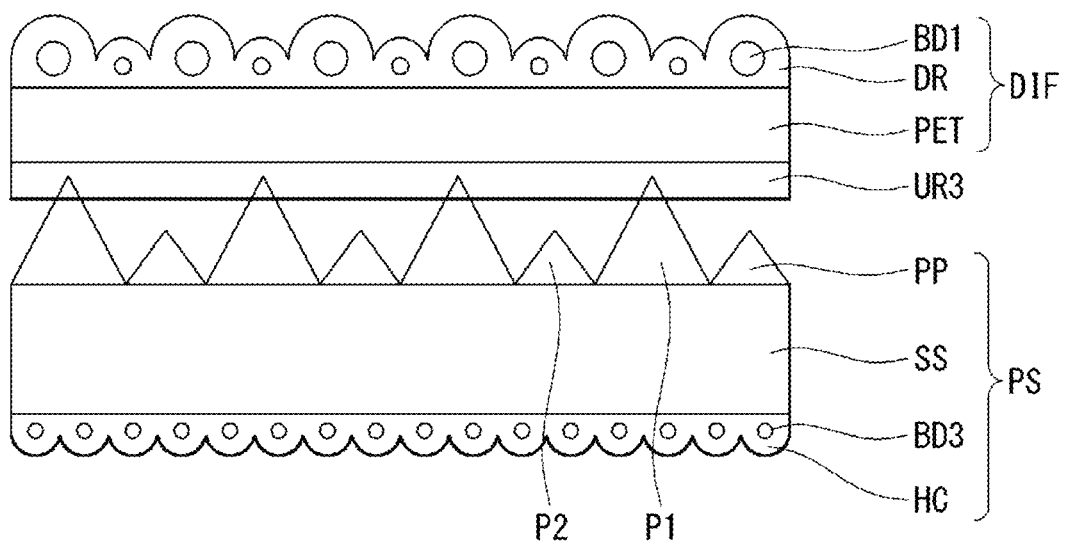
Figure 12:
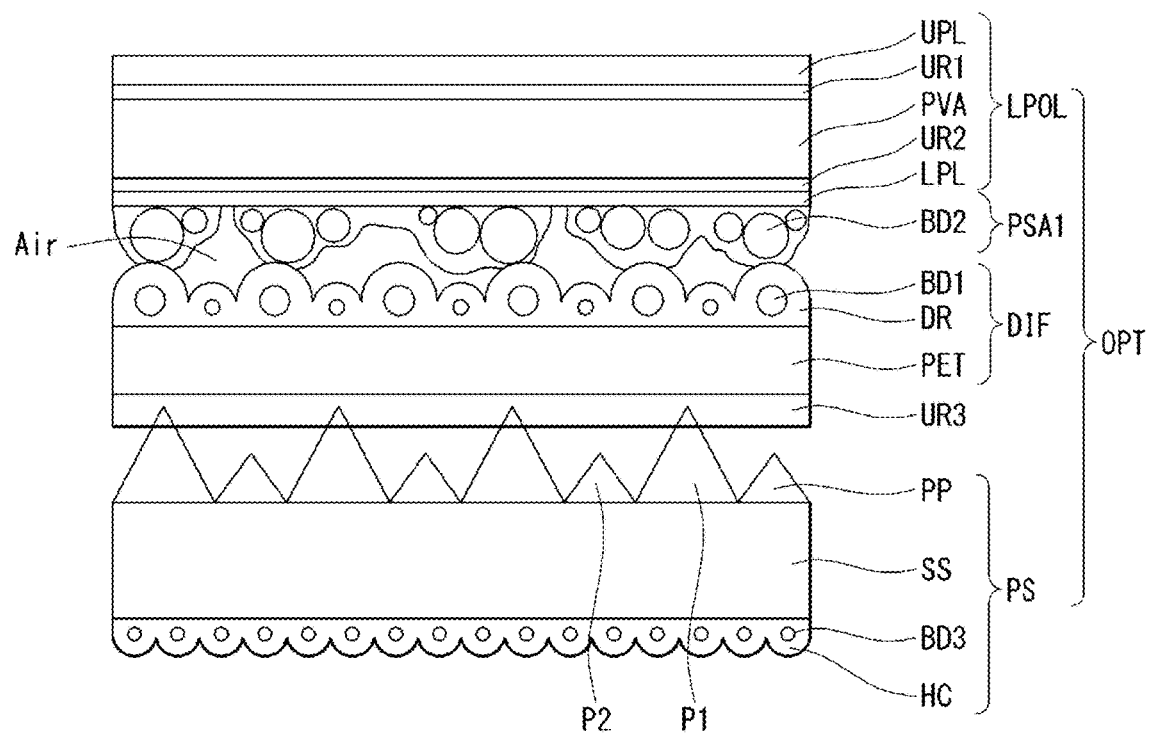

FIGS. 10 to 12 are cross-sectional views showing a process for manufacturing the optical film according to an embodiment of the present disclosure.

With reference to FIG. 10, the lower polarizer LPOL may be prepared. The lower polarizer LPOL may be formed by coating the first UV adhesive layer UR1 on the upper protection layer UPL; coating the second UV adhesive layer UR2 on the lower protection layer LPL; and then laminating the core layer PVA, the upper protection layer UPL, and the lower protection layer LPL at the same time.

The first adhesive layer PSA1 in which the second beads BD2 have been mixed may be formed on the lower protection layer LPL of the formed lower polarizer LPOL. The first adhesive layer PSA1 may be formed by inserting adhesive resin in which the second beads BD2 have been mixed into a spray device (SPD), for example, a spray device such as a sprayer, and then spraying the adhesive resin on the lower polarizer LPOL. In this case, the adhesive resin may be sprayed on the lower polarizer LPOL to widely disperse the adhesive resin. Furthermore, process conditions, such as a shape of a spray nozzle, the amount of spray, and a jet velocity, may be controlled so that the adhesive resin is not sprayed on the lower polarizer LPOL in a uniform layer form. Furthermore, the first adhesive layer PSA1 may be coated in a thickness of 1 to 20 μm to secure an adhesive force.

Next, with reference to FIG. 11, the diffusion sheet DIF including the diffusion unit DR may be formed by coating resin, including the plurality of first beads BD1, on the support film PET. Furthermore, the prism sheet PS may be formed by coating resin on the base sheet SS and by forming the prism portion PP using a mold, for example, a soft mold. Furthermore, the hard coating layer HC may be formed by coating resin, including the plurality of third beads BD3, on the bottom surface of the prism sheet PS. The third UV adhesive layer UR3 is coated on the bottom surface of the formed diffusion sheet DIF, and then may attach to the prism sheet PS by laminating the prism sheet PS. The prism portion PP of the prism sheet PS may be inserted into the third UV adhesive layer UR3, and then may adhere to the diffusion sheet DIF.

With reference to FIG. 12, a surface on which the first adhesive layer PSA1 of the lower polarizer LPOL has been coated and an uneven surface may be disposed to face each other due to the first beads BD1 of the diffusion sheet DIF. Furthermore, the optical film OPT may be formed by laminating the lower polarizer LPOL, the integrated diffusion sheet DIF, and prism sheet PS. The optical film OPT may be formed to have the final haze of 20% to 100% by controlling the haze of the diffusion sheet DIF and the first adhesive layer PSA1. The formed optical film OPT may be cut to a desired size and shape, and may be attached to the bottom surface of an LCD panel.

Figure 13:
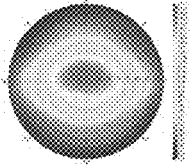
FIG. 13 is a table showing a light profile and brightness according to the density of beads included in a first adhesive layer in the liquid crystal display of FIG. 5 according to an embodiment of the present disclosure.

Experimental data regarding the optical characteristics of LCDs according to comparative examples and the embodiments of the present disclosure is described below. FIG. 13 is a table showing a light profile and brightness according to the density of the beads included in the first adhesive layer in the LCD of FIG. 5 according to an embodiment of the present disclosure. In this example, the particle diameter of a bead is 4 μm, although embodiments are not limited thereto.

FIG. 13 shows that as the area density of the beads included in the first adhesive layer increases to 80, 100, 120, and 140 per mm$^2$, light profiles are uniformly distributed, and brightness also increases from 1912 to 2292 cd/m$^2$. From the experiment results shown in FIG. 13, it may be seen that, as the density of the beads included in the first adhesive layer increases, the uniformity of light is improved and light brightness is also improved.

Figure 14:
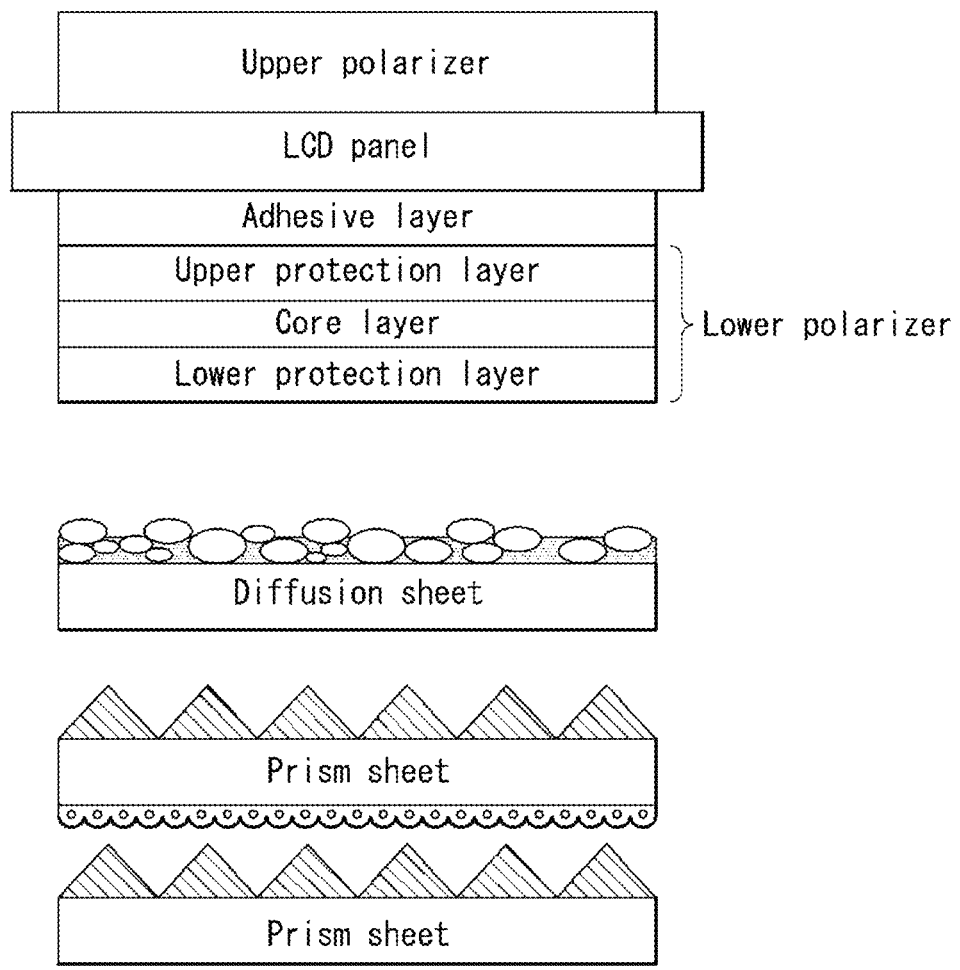
FIG. 14 is a cross-sectional view showing a liquid crystal display according to a comparative example 1.
Figure 15:
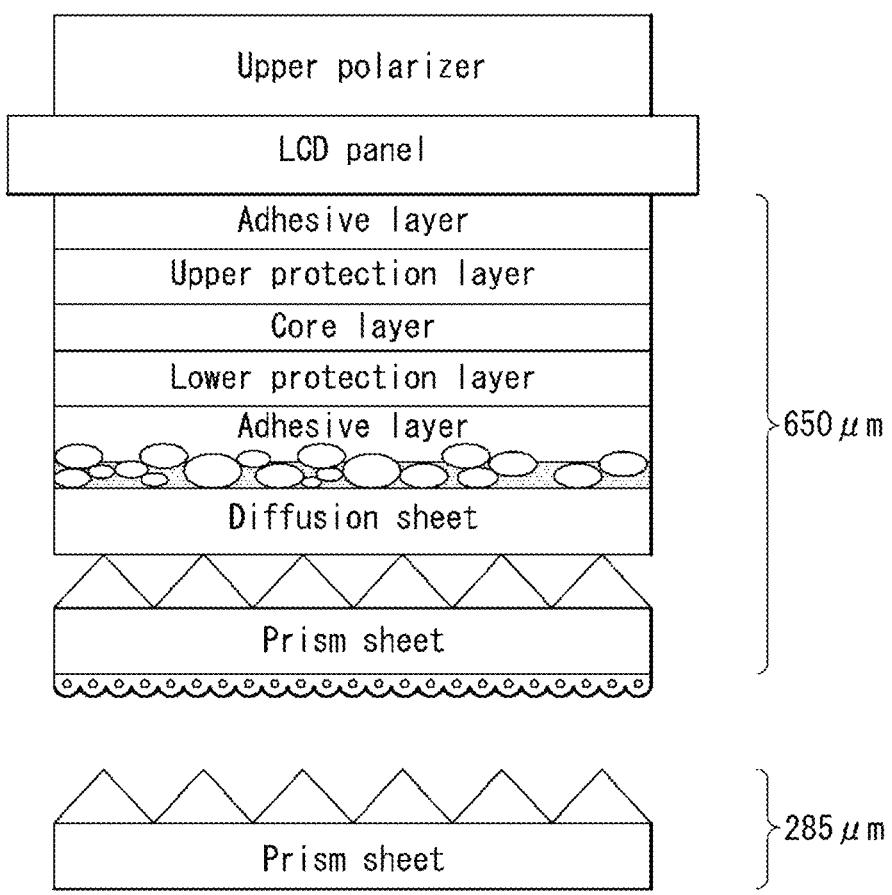
FIG. 15 is a cross-sectional view showing a liquid crystal display according to a comparative example 2.
Figure 16:
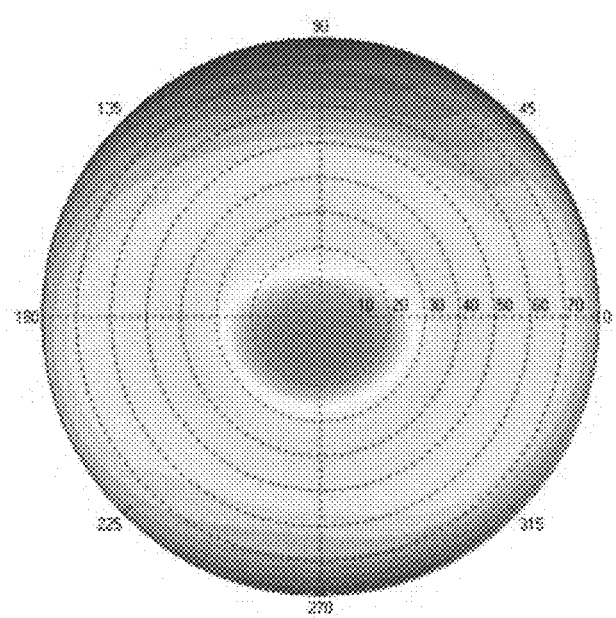
FIG. 16 shows a light profile image of the liquid crystal display according to the comparative example 1.
Figure 17:
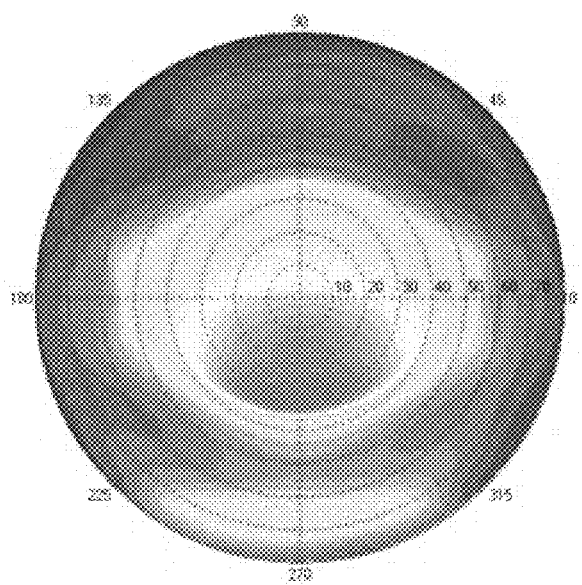
FIG. 17 shows a light profile image of the liquid crystal display according to the comparative example 2.
Figure 18:
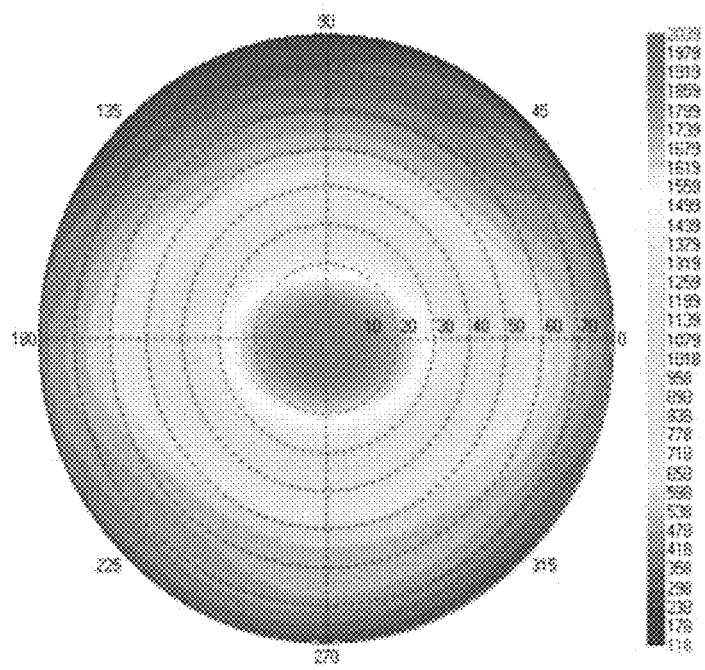
FIG. 18 shows a light profile image of the liquid crystal display according to an embodiment of the present disclosure.

FIG. 14 is a cross-sectional view showing an LCD according to a comparative example 1. FIG. 15 is a cross-sectional view showing an LCD according to a comparative example 2. FIG. 16 shows a light profile image of the LCD according to the comparative example 1. FIG. 17 shows a light profile image of the LCD according to the comparative example 2. FIG. 18 shows a light profile image of the LCD according to an embodiment of the present disclosure.

With reference to FIG. 14, in the LCD according to the comparative example 1, an upper polarizer is positioned on the top surface of an LCD panel. A lower polarizer, to which an upper protection layer and a lower protection layer are adhered with a core layer interposed therebetween, is adhered to the bottom surface of the LCD panel by an adhesive layer. A diffusion sheet and two prism sheets are positioned under the LCD panel, thereby forming the LCD.

With reference to FIG. 15, in the LCD according to the comparative example 2, an upper polarizer is positioned on the top surface of the LCD panel. A lower polarizer, to which an upper protection layer and a lower protection layer are adhered with a core layer interposed therebetween, is adhered to the bottom surface of the LCD panel by an adhesive layer. A diffusion sheet is adhered to the bottom surface of the lower polarizer by an adhesive layer not including a bead. A first prism sheet is adhered to the bottom surface of the diffusion sheet. A second prism sheet is spaced apart from the first sheet without adhering to the first sheet (in contrast to the FIG. 14 comparative example 1), thereby forming the LCD.

The LCD according to an embodiment of the present disclosure that is referred to for the FIG. 18 light profile image corresponds to the LCD of the FIG. 5 example, according to an embodiment of the present disclosure.

FIG. 16 shows a light profile in which light is uniformly distributed in the LCD of the comparative example. In this case, brightness of the comparative example 1 was 100% in the experiment. FIG. 17 shows a light profile in the LCD of the comparative example 2, wherein the uniformity of light is lower than that of the comparative example 1 and brightness was 88% in the experiment, compared to the 100% brightness of the comparative example 1. FIG. 18 shows a light profile in the LCD according to an embodiment of the present disclosure, wherein light uniformity is similar to that of the comparative example 1 and brightness was also 98% in the experiment, which is similar to the brightness 100% of the comparative example 1.

The experiment results reveal that the LCD according to an embodiment of the present disclosure had light uniformity or brightness equal to that of the comparative example 1 in which the lower polarizer and the diffusion sheet were separated. Furthermore, the LCD according to an embodiment of the present disclosure had significantly improved light uniformity and an 10% increase of brightness compared to the comparative example 2 in which the lower polarizer and the diffusion sheet had adhered together by the adhesive layer that does not include beads.

As described above, the optical film according to an embodiment of the present disclosure has an advantage in that it can diffuse light incident from the lower side by refracting the light at the interface of the diffusion sheet and the air layer and at the interface of the air layer and the adhesive layer because the adhesive layer including the plurality of beads is formed between the lower polarizer and the diffusion sheet. Furthermore, the LCD according to an embodiment of the present disclosure has an advantage in that it can prevent a moiré phenomenon from occurring by securing the haze of the diffusion sheet because it includes the optical film. Furthermore, the LCD according to an embodiment of the present disclosure has advantages in that it can omit separate optical films because the lower polarizer, the adhesive layer, the diffusion sheet, and the prism sheet are integrated under the LCD panel and it can be made as thin as possible because the thickness of the backlight unit can be reduced.

It will be apparent to those skilled in the art that various modifications and variations may be made in the present disclosure without departing from the spirit or scope of the invention. Thus, it is intended that embodiments of the present disclosure cover the modifications and variations of this invention provided they come within the scope of the appended claims and their equivalents.

What is claimed is:

1. An optical film, comprising:
   a polarizer comprising:
      a core layer; and
      a lower protection layer under the core layer;
   a diffusion sheet adhered to a bottom surface of the polarizer, the diffusion sheet comprising a plurality of first beads, the diffusion sheet having an uneven surface comprising a plurality of convex parts corresponding to the first beads;
   an adhesive layer between the polarizer and the diffusion sheet, the adhesive layer attaching the polarizer to the diffusion sheet, the adhesive layer comprising a plurality of second beads, the adhesive layer having an uneven surface comprising a plurality of convex parts corresponding to the second beads; and
   an air layer between the polarizer and the diffusion sheet,
   wherein the uneven surface of the diffusion sheet directly contacts the uneven surface of the adhesive layer only at respective pairs of convex parts of the diffusion sheet and convex parts of the adhesive layer, and
   wherein a part of a lower surface of the lower protection layer is exposed between the plurality of convex parts of the adhesive layer, the part of the lower surface of the lower protection layer contacting the air layer.

2. The optical film of claim 1, wherein the air layer is in a remaining space other than in the adhesive layer between the polarizer and the diffusion sheet.

3. The optical film of claim 1, wherein the diffusion sheet and the adhesive layer are partially spaced apart from each other.

4. The optical film of claim 1, wherein the diffusion sheet and the adhesive layer contact each other only at separated portions at pairs of directly contacting convex parts of the diffusion sheet and the adhesive layer.

5. The optical film of claim 1, wherein the adhesive layer has a dot shape.

6. The optical film of claim 1, wherein the plurality of second beads is grouped to form a plurality of groups.

7. The optical film of claim 1, wherein an area density of the plurality of second beads is 50 to 200 per mm$^2$.

8. The optical film of claim 1, further comprising a prism sheet adhered to a bottom surface of the diffusion sheet.

9. A method for manufacturing an optical film, the method comprising:
- forming a diffusion sheet by coating a resin comprising a plurality of first beads on a support film, the diffusion sheet having an uneven surface comprising a plurality of convex parts corresponding to the first beads;
- providing adhesives comprising a plurality of second beads in a spray device;
- forming an adhesive layer by spraying the adhesives on a polarizer, the polarizer comprising a core layer and a lower protection layer under the core layer, the adhesive layer having an uneven surface comprising a plurality of convex parts corresponding to the second beads;
- laminating the diffusion sheet and the polarizer using the adhesive layer therebetween, such that the uneven surface of the diffusion sheet directly contacts the uneven surface of the adhesive layer only at respective pairs of convex parts of the diffusion sheet and convex parts of the adhesive layer; and
- providing an air layer between the polarizer and the diffusion sheet, wherein a part of a lower surface of the lower protection layer is exposed between the plurality of convex parts of the adhesive layer, the part of the lower surface of the lower protection layer contacting the air layer.

10. The method of claim 9, wherein the spray device comprises a sprayer.

11. A liquid crystal display, comprising:
- a display panel; and
- an optical film adhered under the display panel, the optical film comprising:
  - a polarizer comprising:
    - a core layer, and
    - a lower protection layer under the core layer;
  - a diffusion sheet adhered to a bottom surface of the polarizer, the diffusion sheet comprising a plurality of first beads, the diffusion sheet having an uneven surface comprising a plurality of convex parts corresponding to the first beads;
  - an adhesive layer between the polarizer and the diffusion sheet, the adhesive layer attaching the polarizer to the diffusion sheet, the adhesive layer comprising a plurality of second beads, the adhesive layer having an uneven surface comprising a plurality of convex parts corresponding to the second beads; and
  - an air layer is between the polarizer and the diffusion sheet,
  - wherein the uneven surface of the diffusion sheet directly contacts the uneven surface of the adhesive layer only at respective pairs of convex parts of the diffusion sheet and convex parts of the adhesive layer, and
  - wherein a part of a lower surface of the lower protection layer is exposed between the plurality of convex parts of the adhesive layer, the part of the lower surface of the lower protection layer contacting the air layer.

12. The optical film of claim 1, wherein a part of the plurality of second beads contacts the convex parts of the diffusion sheet.

* * * * *